Dec. 8, 1959  C. W. NOYES  2,916,725
MULTIPLE UNIT INDICATOR WITH INDIVIDUAL TESTING SYSTEM
Filed Feb. 12, 1958  3 Sheets-Sheet 1
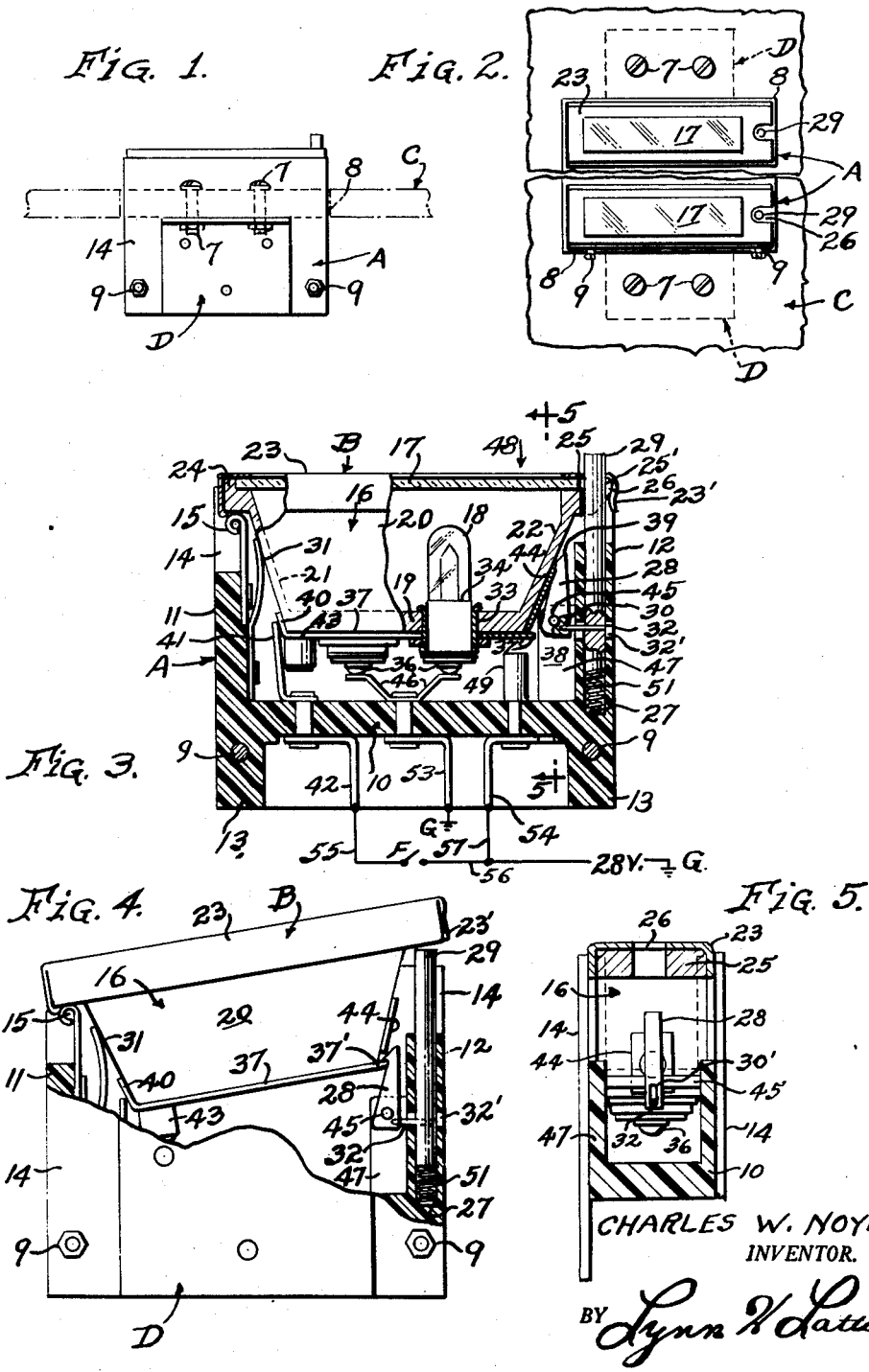
CHARLES W. NOYES
INVENTOR.
BY Lynn H Latta
ATTORNEY Dec. 8, 1959  C. W. NOYES  2,916,725
MULTIPLE UNIT INDICATOR WITH INDIVIDUAL TESTING SYSTEM
Filed Feb. 12, 1958  3 Sheets-Sheet 2
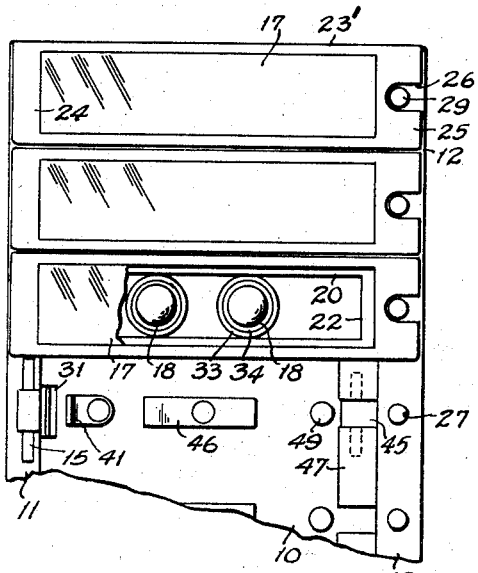
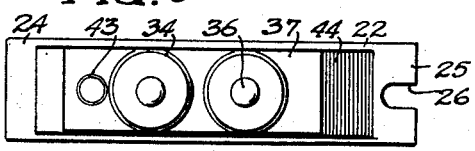
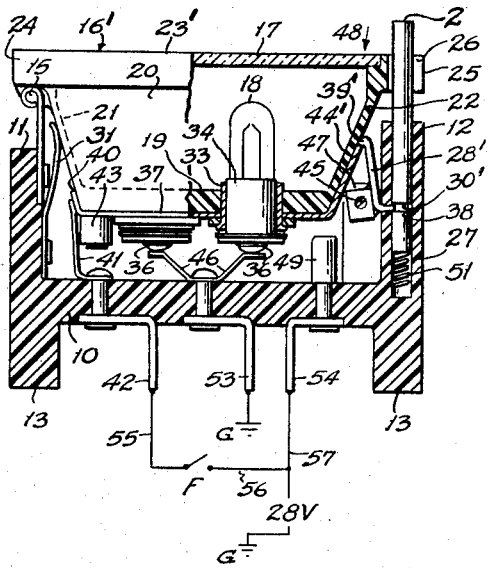
INVENTOR.
CHARLES W. NOYES
BY
Lynn H. Latta
-ATTORNEY- Dec. 8, 1959 C. W. NOYES 2,916,725
MULTIPLE UNIT INDICATOR WITH INDIVIDUAL TESTING SYSTEM
Filed Feb. 12, 1958 3 Sheets-Sheet 3

INVENTOR.
CHARLES W. NOYES
BY Lynn H Latta
-ATTORNEY-

United States Patent Office 2,916,725
Patented Dec. 8, 1959

2,916,725

MULTIPLE UNIT INDICATOR WITH INDIVIDUAL TESTING SYSTEM

Charles W. Noyes, Anaheim, Calif., assignor to Marco Industries Company, Anaheim, Calif.

Application February 12, 1958, Serial No. 714,931

19 Claims. (Cl. 340—52)

This application is in part a continuation of my earlier copending applications S.N. 623,834, now abandoned filed November 23, 1956, for Multiple Unit Indicator With Individual Testing System and S.N. 544,299, now abandoned filed November 1, 1955, for Multiple Unit Annunciator With Press-to-Test Feature.

This invention relates to indicator lights, and has as its general object to provide an improved indicator light unit of a type which may be embodied in association with other like units in a multiple unit annunciator apparatus wherein the several units may bear respective indicator legends that are rendered visible when illuminated. Such an indicator unit desirably embodies a narrow elongated light casing having a translucent indicator face bearing a selected legend, and the invention contemplates an arrangement wherein the light casing is hinged to a mounting bracket or casing at one end, is normally latched thereto at its other end, and is provided with means yieldingly biasing it to its normal latched position from which it can be (1) depressed to a testing position for closing a test circuit for testing the operating condition of its illuminating means, and (2) released for outward swinging movement away from the mounting bracket or casing to provide for access to the back of the light casing to replace burned-out light bulbs or to otherwise service the unit.

A specific object of the invention is to provide an improved latching mechanism in an indicator unit such as outlined above.

Another object is to provide an indicator light unit such as outlined above, wherein the light casing may be released to a position wherein the circuit to its illuminating lamps is opened, with the light casing remaining latched to the mounting casing and restrained from movement to the servicing position.

Other objects and advantages will become apparent in the ensuing specifications and appended drawing in which:

Fig. 1 is a side view of an indicator light unit embodying the invention, shown in connection with a mounting panel illustrated in phantom;

Fig. 2 is a plan view of the same;

Fig. 3 is a detail sectional view thereof;

Fig. 4 is a side view of the same, partially in section, illustrating the release position of the light casing;

Fig. 5 is a transverse sectional view of the unit, taken on the line 5—5 of Fig. 3;

Fig. 6 is a fragmentary front view of a tier of indicators of my invention, embodied in an annunciator system of slightly modified form;

Fig. 7 is a fragmentary side view thereof;

Fig. 8 is a back view of one of the indicator units;

Fig. 9 is a transverse sectional view thereof, taken on the line 9—9 of Fig. 6; and Fig. 10 is a sectional view taken on the line 10—10 of Fig. 6.

*The preferred form—Figs. 1–5*

Figure 11:
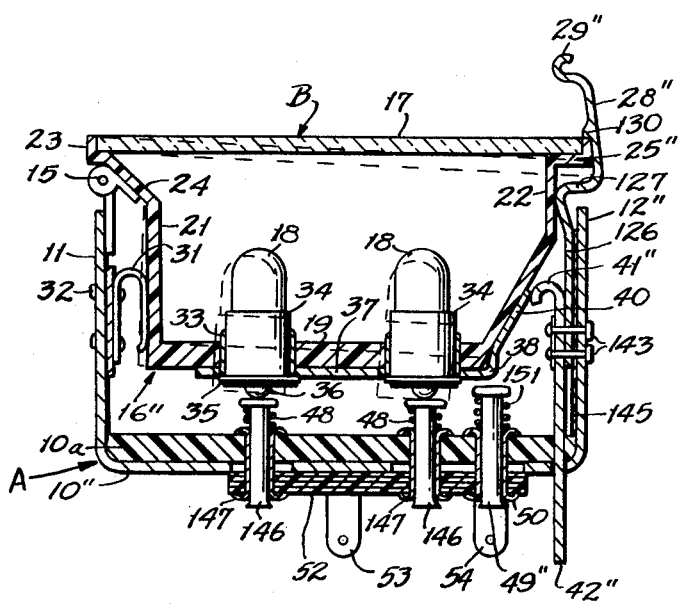
Fig. 11 is a transverse sectional view of a modified form.

Referring now to the drawings in detail, I have shown therein, as an example of a preferred form in which the invention may be embodied, an indicator light embodying generally a mounting frame A and a light cartridge B mounted therein, the frame A being adapted to be mounted in a panel C (Fig. 1) by means of brackets D. Although a single one of the units can be mounted in isolated relation in a panel, the invention contemplates that normally a number of units will be mounted in a bank in a panel C. Brackets D are angle brackets, and are of less depth than the light unit, whereby the brackets may be attached, as by bolts 7 to the rear or under face of panel D, with the forward portions of the units projecting through an opening 8 in the panel. Brackets D are attached only to the end units of the bank, the units being secured together in the bank by bolts 9 extending through them.

Frame A is of box form, including a core of insulating material, H-shaped as shown in Fig. 3, comprising a back web (bottom) 10 bridging between respective arms 11 and 12 projecting forwardly at respective sides thereof. Frame A has wall members (plates) 14 (Fig. 5) cooperating to define a narrow rectangular socket in which light cartridge B is normally received. Plates 14 may be of metal and secured to core 10—12 by bolts 9. In the rear of the frame A is a terminal-housing recess defined between projections 13.

Light cartridge B at one end is attached to arm 11 by a hinge 15. Cartridge B comprises a casing 16 of insulating material and a light-transmitting (e.g. translucent) window 17 bearing a legend which is preferably imprinted on the inner side of the window so as to be substantially invisible when the light bulbs 18, contained in the casing 16, are not lighted.

The casing 16 is of a relatively narrow, elongated rectangular shape as viewed from the front (Fig. 1). Its depth, front to rear, is sufficient to accommodate the height of light bulbs 18. Casing 16 has a back 19 in which the light bulbs 18 are mounted, and has sides 20, ends 21 and 22, and transverse end flanges 24, 25 which project over the arms 11, 12 of the mounting frame. Between end flanges 24 and 25 and the outer margins of sides 20 is defined a shallow recess in which window 17 is seated. Casing 16 is mounted in a rectangular cap 23, one end of which is attached to hinge 15. The end flange 24 is confined between one end of the cap and hinge 15, and end flange 25 is secured by spring fingers 23' which snap over the rounded ends of a pair of laterally spaced lugs 25' constituting a bifurcated extremity of end flange 25. Cap 23 is of stamped sheet metal, including an apertured front web and a marginal rim snugly receiving the casing 16 and latched thereto by spring fingers 23'. Cap 23 also functions to secure the window 17 in its seating recess.

Lugs 25' define a notch 26 which is aligned with a bore 27 in flange 12. A latch finger 28 is actuated by a push rod 29 which is slidably mounted in bore 27.

A leaf spring 31, attached to the inner face of end member 11, bears yieldingly against the end 21 of casing 16, under sufficient deflection to maintain the casing normally in its latched position shown in Fig. 2.

Latch finger 28 has a heel portion provided with a recess 30' in which is received the free end of a pin 32 that is secured in a small diametral bore in latch rod 29. Pin 32 projects through a slot 32' in end member 12. At its free end, latch finger 28 has a hook 39 engaging the end of a keeper bar 44 attached to casing end 22. Latch finger 28 is secured to (e.g. pressed onto) a fulcrum pin 45 the ends of which are pivoted in ears 47 which may be integral with core end 12, projecting inwardly therefrom. A coil spring 51 is engaged under compression between the bottom of bore 27 and the inner end of push rod 29 for urging the latter outwardly and latch finger 28 toward latching position.

A bus bar 37 has an end portion 37' projecting behind keeper bar 44 and constituting a second keeper projection which is adapted to engage hook 39 upon outward springing of cartridge B when latch finger 28 is moved to an intermediate position (shown in Fig. 4) by initial pressure against push rod 29. From this intermediate position, latch finger 28 may be shifted further to release cartridge B completely so that it may be inverted to provide servicing access to its rear side. In the initial actuation of the latch finger, movement of cartridge B will be limited by contact of end 25 thereof against the finger tip which is pressed against the push rod 29. The second stage of latch release action may be accomplished by inserting the fingernail between the released end 25 and the end of push rod 29, and engaging the push rod with the fingernail.

It may now be noted that by pressing inwardly on push rod 29, latch finger 28 will be tilted clockwise as viewed in Fig. 4, to release hook 39 from the end of keeper bar 44, releasing the casing 16 for swinging movement around the axis of hinge 15 in an anti-clockwise direction as viewed in Fig. 4, to a point where it is inverted with relation to the panel 10, thus exposing the back 19 for removal and replacement of light bulbs 18.

Bulbs 18 have their base portions 34 mounted in sockets 33 which in turn are mounted in openings in back 19. Sockets 33 are extended through and secured to bus-bar 37 which extends lengthwise of back 19 and is mounted thereon. The end contacts 36 of light bulbs 18 are positioned to engage a pair of spring brush contacts 46 which as shown may be integrally attached together in the form of a U-yoke the web of which is mounted on panel 10. As the casing is pushed inwardly for testing, the brushes 46 yield by a flexing action while maintaining engagement with contacts 36.

In the intermediate latching position of Fig. 4, cartridge B is in an inoperative condition (contacts 36 being withdrawn from engagement with contacts 46) and yet is held against flopping back and forth (e.g. in response to lurching of an airplane).

Bus-bar 37 has an end portion which is bent around the corner of casing 16 on the end thereof near hinge 15, to provide a breaker contact 40. Contact 40 is normally engaged yieldingly under tension by a resilient brush contact 41 mounted on core web 10, brush 41 being flexed sufficient to maintain good electrical contact in the normal position of the parts shown in Fig. 3. Contact 41 is mounted to web 10 by the illustrated rivet extending through the web, and is connected thereby to a terminal 42. A breaker finger 43 is secured to back 19 adjacent contact 40, and is normally in close proximity to brush 41 to separate the same from contact 40 when casing 16 is depressed rearwardly as indicated by arrow 48 of Fig. 3.

A test contact 49 is attached to web 10 in a position beneath the other rear corner of casing 16, for engagement by the opposed end portion of a bar contact 38 when the casing is depressed as aforesaid. The brush contacts 46 and test contact 48 are mounted on core web 10 by the rivets shown, and terminals 53 and 54 are connected to these respective contacts by the respective rivets. The rivet of test contact 48 is an integral part thereof.

Fig. 3 illustrates schematically the electrical circuit in which my improved indicator may be utilized. Terminal 42 may be connected by a conductor 55 to a "fault" switch F embodied in mechanism (e.g. landing gear actuators) the condition of which is to be indicated. The other side of switch F, and terminal 54, may be connected by respective conductors 56, 57 to a source of electrical current indicated at 28V, in a circuit such as that described and illustrated in the application of George H. Rodgers, Serial Number 621,818, filed November 13, 1956.

Operation

In operation, each of the indicator units will normally stand in the position shown in Fig. 3, with contacts 40, 41 closed, with keeper bar 45 engaging latch hook 39, and with the circuit through test contact 49 standing open. Upon any occurrence of an abnormal condition in the apparatus being monitored by the particular indicator unit (which abnormal condition may be indicated by the closing of its fault switch F) the particular indicator 16 will be illuminated and the legend on its indicator face 17 will become visible to the operator so as to apprise him of a condition to be corrected. At the same time, the operator's attention may be called to the indication when it first occurs, by means of a warning device (not illustrated) which may be of the type shown in the aforesaid application of George H. Rodgers. The illumination of the indicator to indicate the condition will continue so long as the condition remains uncorrected and will be erased when the fault switch F is opened as the result of such correction.

The operator may at any time test the condition of the electric light bulbs 18 by pressing inwardly against the casing 16 at its end opposite from hinge 15, as indicated by arrow 48. In this operation, breaker finger 43 will swing leftwardly as viewed in Fig. 3, engaging brush 41 and separating it from contact 40, thus breaking the connection to fault switch F. Subsequently, bus-bar 37 will engage test contact 49 to close a shunt circuit around switch F directly to source 28V, and if the bulbs 18 are in good operating condition, they will be illuminated. Failure to illuminate the indicator upon engagement of the test contact will indicate that they need replacement.

To gain access to the rear side of the casing 16 for replacement of the bulbs, the operator presses upon latch rod 29, which will rotate latch finger 28 clockwise as viewed in Fig. 3, freeing the casing for hinging movement, in a counter clock-wise direction around hinge 15, to an inverted position wherein the back 19 is exposed. The electric light bulbs may then be drawn rearwardly out of their sockets and replaced by fresh bulbs.

In the event it is desired to take a particular indicator unit out of operation, it can be released to the intermediate position shown in Fig. 4, in which it is cut out of the indicator circuit but remains latched to frame A and restrained from vibrating loosely on its hinge 15.

Modified form—Figs. 6–10

The modified indicator mechanism of the invention disclosed in Figs. 6–10 is largely the same as the preferred form described above, corresponding parts being designated by the same reference numerals in both forms. The modified form differs from the preferred form in the following respects:

A plurality of the indicator units B' are mounted in a mounting frame A' of double channel form, H-shaped in cross section, including respective side flanges 11 and 12 projecting forwardly and back flanges 13 projecting rearwardly.

Each indicator unit B' includes a casing 16' of insulating material, with integrally molded marginal frame 23' at its front side, in which window 17 is mounted. Frame 23' has integral end portions 24 and 25, corresponding generally to the parts 24 and 25 of Figs. 1–5.

Latch finger 28' is generally of Z-shape, formed of a short length of ribbon metal, its central body portion lying in a plane extending transversely, and its respective ends bent substantially at right angles to that plane to constitute the hook 39' and a tail lever 38 extending into and engaged in an annular groove 30' in push rod 29. Latch finger 28' is mounted on fulcrum pin 45.

Keeper bar 44' is formed as an integral extension of bus bar 37. Projection 37' of Figs. 1–5 is omitted.

The operation of the modified form of Figs. 6–10 is the same as that of the preferred form of Figs. 1–5 with the exception that the initial unlatching operation releases the cartridge B for movement to the inverted servicing position.

Referring back to Figs. 1–5, where a plurality of the indicator units are mounted in bank, each plate 14 may be common to a pair of adjacent units, it being unnecessary to duplicate side plates between adjoining indicator units. The plates 14 provide separate sockets or cells for the several indicator cartridges.

The intermediate latching position makes it possible for a pilot in an airplane to extinguish a warning signal so as to eliminate the glare of its light in his eyes (e.g. during night flying, when the glare, even though of low power, could be disturbing) and yet to leave a visible reminder (the protruding position of the indicator cartridge) of the existence of a fault condition that does not present an urgent need for immediate correction but should be taken care of at a convenient time. The cartridge is latched in this protruding position, restrained against movement to a position of further projection (which might interfere with full view of adjacent indicator units) by the secondary latching function.

*The modified form shown in Fig. 11*

The form of the invention shown in Fig. 11 is the same as that described above insofar as the same reference numerals are used, and differs therefrom in the following respects:

The latching means in this form comprises a leaf spring latch 28″ including a spring shaft portion 126, riveted to casing arm 12″ by rivets 143 which also extend through and anchor to the arm 12″ the shaft of the breaker contact 41″ which normally engages the breaker contact 40 on the end of bus-bar 37. Breaker contact 41″ and 40 are in this case arranged at the movable end of casing 16″ so that the inward movement of the latter when depressed by finger pressure causes the contact 40 to separate from the contact 41″. Terminal 42″ is in this case an extension of the shaft of breaker contact 41″. Spring latch 28″ has an integral offset portion 127 providing a seat to limit the inward depression of the casing B by engaging the projecting end portion 25″ of the casing. Latch 28″ also has an integral latch hook 130 to engage the outer side of projection 25″ to latch the casing in its normal position shown in full lines. The tip portion 29″ of latch 28″ functions for releasing the latch by fingertip pressure applied outwardly parallel to the indicator window 17. A strip of insulating material 145, interposed between latch 28″ and arm 12″, together with the insulators shown around rivets 143, suitably insulate the contacts 41″ from the frame.

The terminal 53 is connected to a pair of conductor sleeves 147 bonded in insulator bottom 10a of casing bottom 10″, and are connected to the end contacts 36 of the light bulbs 18 by sliding pin contacts 146 slidably mounted in the sleeves 147 and loaded by coil springs 48. Test contact 49″ is likewise of sliding pin form, being loaded by a coil spring 151, to be engaged by moving test contacts 37 when casing 16″ is depressed to contact the spring latch with seat 127. The casing 16″ is released for inverting movement by pulling latch 28″ outwardly until hook 130 releases the projection 25″ of the casing 16″.

I claim:

1. In an indicator unit for a multiple unit annunciator apparatus: a mounting frame; an elongated indicator casing of generally rectangular side elevation hinged at the forward corner of one end thereof to said frame, having a back normally in spaced adjacent relation to said frame and an indicator face opposite said back; means operative to latch the other end of said casing to said frame, said means being releasable to allow the casing to be swung to inverted position with relation to said frame; an electric light bulb within said casing, having a base mounted in said back and having a pair of terminal contacts; a yielding terminal carried by said frame, normally in conducting engagement with one of said terminal contacts; a breaker contact carried by said casing and electrically connected to the other of said terminal contacts; a resilient contact brush mounted on said frame and normally in contact with said breaker contact; a movable test contact carried by said casing near its latched end; a test contact carried by said frame in opposed normally spaced relation to said movable test contact, for engagement thereby upon depression of said latched end of the casing to establish a test circuit to said bulb; and means carried by said casing for engaging said contact brush and springing it out of contact with said breaker contact so as to break the connection between said brush and said light bulb when said casing is depressed for engaging said test contacts.

2. In an indicator: a mounting frame; an elongated indicator casing hinged at one end to said frame; means normally latching the other end of said casing to said frame, said means being releasable to allow the casing to be swung to inverted relation to said frame; said casing having a back in adjacent spaced relation to said frame and an indicator face opposite said back; an electric light bulb within said casing, said bulb having a base mounted in said back and being removable therethrough when the casing is inverted, said base constituting a lateral contact for said bulb, said bulb having an end contact; a yielding terminal carried by said frame and normally in conducting engagement with said end contact; a bus bar attached to the rear face of said back, extending longitudinally thereof and having an end portion, constituting a breaker contact, disposed at the rear corner of said casing at said one end thereof; a resilient contact brush mounted on said frame, projecting toward said hinge, and normally engaged against said breaker contact laterally of said one end of the casing; a movable test contact carried by said casing near its latched end; a test contact carried by said frame in opposed normally spaced relation to said movable test contact, for engagement thereby upon depression of said latched end of the casing, for establishing a test circuit to said bulb; and a finger projecting rearwardly from said back adjacent said corner alongside said brush contact and adapted to swing laterally and to engage an intermediate area thereof upon depression of said casing for engagement of said test contacts, whereby to spring said brush contact laterally and to separate it from said breaker contact.

3. In an indicator unit for a multiple unit annunciator apparatus: a mounting frame having a bottom and projecting arms at respective sides thereof and having substantially parallel wall members cooperating with said arms to define a socket; an elongated indicator casing hinged at one end to one of said arms and normally received in said socket, said casing having a back in spaced adjacent relation to said bottom of the frame and an indicator face opposite said back; an electric bulb within said casing, having a base mounted in said back and having a pair of terminal contacts; a yielding terminal carried by said frame, normally in conducting engagement with one of said contacts; a movable breaker contact carried by said casing and electrically connected to the other of said terminal contacts; a cooperating breaker contact mounted on said frame and normally in contact with said movable breaker contact; a movable test contact carried by said casing and connected to said other terminal contact; a test contact carried by said frame in opposed normally spaced relation to said movable test contact, for engagement thereby upon depression of the other end of the casing, for establishing a test circuit to said bulb; said movable breaker contact being disengaged from said cooperating breaker contact so as to break the connection between the latter and said light bulb when said casing is depressed for engaging said test contacts; and means operative to latch said other end of the casing to said frame, said latching means comprising a push rod, the other arm having therein a slideway at right angles to the plane of said indicator face and registering with said other end of the casing, said rod being slidably mounted in said slideway and having a pin extending laterally therefrom, a latch finger pivoted to said frame adjacent the inner face of said other end member on an axis parallel to the axis of said hinge, said latch finger having at its forward end a latch hook interengageable with said other end of the casing for holding the casing in its normal position and having at its other end a notch in which the free end of said pin is engaged for receiving movement from said push rod, and a coil spring under compression between the rear end of said push rod and the bottom of said slideway, for yieldingly biasing said push rod in the direction for maintaining said hook engaged with said casing.

4. In an indicator unit for a multiple unit annunciator apparatus: a mounting frame having a bottom and forwardly projecting arms at respective sides thereof; an elongated indicator casing hinged at one end to one of said arms, having a back in spaced adjacent relation to said bottom and an indicator face opposite said back; an electric light bulb within said casing, having a base mounted in said back and having a pair of terminal contacts; a terminal carried by said frame, yielding contact means normally providing a conducting connection between said terminal and one of said contacts; a movable breaker contact carried by said casing and electrically connected to the other of said terminal contacts; a cooperating breaker contact mounted on said frame and normally in contact with said movable breaker contact; a movable test contact carried by said casing and connected to said other terminal contact; a test contact carried by said frame in opposed normally spaced relation to said movable test contact, for engagement thereby upon depression of the other end of the casing, for establishing a test circuit to said bulb; said movable breaker contact being disengaged from said cooperating breaker contact so as to break the connection between the latter and said light bulb when said casing is depressed for engaging said test contacts; and means operative to latch said other end of said casing to said frame, said latching means comprising a push rod, the other arm having therein a slideway at right angles to the plane of said indicator face and registering with said other end of the casing, said rod being slidably mounted in said slideway, a latch finger pivoted to said frame adjacent the inner face of said other flange on an axis parallel to the axis of said hinge, said latch finger having at its forward end a latch hook inter-engageable with said other end of the casing for holding the casing in its normal position and having at its other end a connection with said push rod for receiving movement therefrom such as to release said hook from said casing upon depression of said rod, and a coil spring under compression between the rear end of said push rod and the bottom of said slideway, for yieldingly biasing said push rod in the direction for maintaining said hook engaged with said casing.

5. An indicator light as defined in claim 4, including spring means acting between said frame and said casing to propel the latter toward an inverted position relative to said frame, when said latch is released, and a projection on the rear corner of said other end of the casing, adapted to engage said hook to arrest the movement of said casing toward said inverted position at an intermediate point thereof, said projection being adapted to clear said hook upon a second depression of said push rod, so as to allow said casing to be moved to said inverted position.

6. An indicator unit as defined in claim 4, wherein said electric light bulb is removable rearwardly through the back of the casing when the casing is in said inverted position.

7. An indicator as defined in claim 1, wherein the parts are arranged for separating said breaker contacts prior to engagement of said test contacts.

8. An indicator as defined in claim 1, wherein said breaker contact is located at the back corner of said casing at said one end thereof for lateral swinging when said casing is depressed rearwardly, wherein said brush contact engages said breaker contact laterally of said one end, and wherein said brush engaging means comprises a finger rigidly attached to said casing at said back corner, projecting rearwardly from said back, and engageable with said brush contact to spring it laterally.

9. In an indicator: a mounting frame; an elongated indicator casing hinged at one end to said frame; means normally latching the other end of said casing to said frame, said means being releasable to allow the casing to be swung to inverted relation to said frame; said casing having a back normally in adjacent spaced relation to said frame and an indicator face opposite said back; an electric light bulb within said casing, said bulb having a base mounted in said back and being removable therethrough when the casing is inverted, said base constituting a lateral contact for said bulb, said bulb having an end contact; a terminal carried by said frame; yielding conductor means normally providing a conducting connection between said terminal and said end contact; a breaker contact carried by said casing and electrically connected to said base; means on said frame for normally carrying current to said breaker contact; a movable test contact carried by said casing near its latched end; a test contact carried by said frame in opposed normally spaced relation to said movable test contact, for engagement thereby upon depression of said latched end of the casing, for establishing a test circuit to said bulb; said indicator casing being operable for disconnecting said current-carrying means from said breaker contact so as to break the normal connection to said light bulb when said casing is depressed for engaging said test contacts.

10. In an indicator unit for a multiple unit annunciator apparatus: a mounting frame having forwardly projecting arms at respective sides thereof; an elongated indicator casing hinged at one end to one of said arms, having a back normally in spaced adjacent relation to said frame and an indicator face opposite said back; an electric light bulb within said casing, having a base mounted in said back and having a pair of terminal contacts; a terminal carired by said frame, yielding conductor means normally in conducting engagement with said terminal and with one of said contacts; a breaker contact carried by said casing and electrically connected to the other of said terminal contacts; current-carrying means on said frame normally connected electrically to said breaker contact; a test contact carried by said frame in opposed normally spaced relation to said movable test contact, for engagement thereby upon depression of said latched end of the casing, for establishing a test circuit to said bulb; said casing being operable for disconnecting said current-carrying means from said breaker contact so as to break the connection between said brush and said light bulb when said casing is depressed for engaging said test contacts; and means operative to latch the other end of said casing to said frame, said latching means comprising a push rod; the other arm having therein a slideway at right angles to the plane of said indicator face and registering with said other end of the casing, said rod being slidably mounted in said slideway and having a recess, a latch finger pivoted to said frame adjacent the inner face of said other arm on an axis parallel to the axis of said hinge, said latch finger having at its forward end a latch hook interengageable with said other end of the casing for holding the casing in its normal position and having at its other end a lever tip extending through said other arm into said slideway and engaged in said recess, and resilient means for yieldingly biasing said push rod in the direction for maintaining said hook engaged with said casing.

11. An indicator unit as defined in claim 10, including a coil spring under compression between the rear end of said push rod and the bottom of said casing, said coil spring constituting said means for yieldingly biasing said push rod in the direction for maintaining said hook engaged with said casing.

12. In an indicator: a mounting frame having forwardly projecting arms at respective sides thereof; an elongated indicator casing hinged at one end to one of said arms; means normally latching the other end of said casing to the other of said arms, said means being releasable to allow the casing to be swung to inverted relation to said frame; said casing having a back normally in spaced adjacent relation to said frame and an indicator face opposite said back; an electric light bulb within said casing, having a base mounted in said back and having a pair of terminal contacts; a terminal carried by said frame; and yielding conductor means providing a normally conducting connection between said terminal and one of said contacts; said latching means comprising a push rod, the other arm having a slideway extending longitudinally therein and registering with said other end of the casing, said rod being slidably mounted in said slideway, a latch finger pivoted to said panel adjacent the inner face of said other flange on an axis parallel to the axis of said hinge, said latch finger having at its forward end a latch hook interengageable with said other end of the casing for latching the casing in its normal position and having at its other end a lever extending through said other arm into said slideway and having a connection with said push rod for transmitting latching and unlatching movement from said push rod to said latch hook, and a coil spring under compression between the rear end of said push rod and the bottom of said slideway, for yieldingly biasing said push rod in the direction for maintaining said hook latched to said casing.

13. An indicator device comprising: a mounting frame of U-section including a pair of side arms and a bottom member extending between and joining said side arms; a narrow, deep, elongated lamp casing having a narrow elongated light-transmitting front and a lamp-mounting back, normally received within said frame; a hinge joining one end of said casing, near said front, to one of said side arms; spring means engaged between said one side arm and said one end of the casing and yieldingly loading said casing for outward swinging movement of the other end thereof away from said frame around the axis of said hinge; a spring urged latch mounted on said casing and having a free end provided with a hook engageable with a projection on said casing to limit said outward swinging movement thereof at a normal position of substantial parallelism between the casing and frame, while permitting inward depression of said casing toward the frame; a lamp socket in said casing back; an electric lamp having a central contact and a base constituting a lateral contact mounted in said socket; a yielding contact mounted on said bottom member and yieldingly engaging said central contact between said bottom member and casing back; a pair of normally engaged contacts including a contact carried by said casing and connected to said lamp base and a contact carried by said frame; a movable contact carried by said casing and likewise connected to said lamp base; and a test contact carried by said back member in a position opposed to said movable contact, said casing being arranged so that its said other end can be depressed away from said latch hook toward said frame, whereby to first break contact between said normally engaged contacts and then establish contact with said test contact; and said latch being operable to release said other end of the casing for swinging movement through an arc of approximately 180 degrees, whereby to expose the rear end of said lamp for removal through said casing back from the rear side thereof, and to expose the interior of said bracket for servicing operations.

14. An indicator device as defined in claim 13, wherein said casing has end members received between said frame side arms and said casing front has end extremities projecting beyond said end members and overhanging the forward extremities of said frame side arms.

15. An indicator device as defined in claim 14, wherein said spring means consists of a leaf spring attached to the inner wall of said one side arm and in flexed engagement with the adjacent end of said casing.

16. An indicator device comprising: a mounting frame of U-section including a pair of side arms and a back member extending between and joining said side arms; a narrow, deep, elongated lamp casing having a narrow elongated light-transmitting front and a lamp-mounting back, normally received within said frame; a hinge joining one end of said casing, near said front, to one of said side arms; spring means engaged between said one side arm and said one end of the casing and yieldingly loading said casing for outward swinging movement of the other end thereof away from said back member around the axis of said hinge; latch means operating between the other of said side members and said other end of the casing to normally retain said casing in an operative position; a lamp socket in said casing back; an electric lamp having a central contact and a base constituting a lateral contact mounted in said socket; a yielding contact mounted on said back member and yieldingly engaging said central contact between said back member and casing back; a breaker contact carried by said other side arm, adjacent said latch means; a movable contact carried by said casing at said other end thereof, connected to said lamp base and normally engaged with said breaker contact; and a test contact carried by said back member rearwardly of said other end of the casing in a position opposed to said movable contact, said casing being arranged so that its said other end can be depressed away from said latch toward said frame, whereby to first break contact between said movable contact and said fixed contact and then establish contact with said test contact; and said latch means being operable to release said other end of the casing for swinging movement through an arc of approximately 180 degrees, whereby to expose the rear end of said lamp for removal through said casing back from the rear side thereof, and to expose the interior of said bracket for servicing operations.

17. In an indicator unit for a multiple unit annunciator apparatus: a mounting frame; an indicator casing having a relatively narrow elongated indicator face at its front and having a back in spaced generally parallel relation to said indicator face and normally in spaced adjacent relation to said frame, said casing having at one end, near the plane of said indicator face, a hinge connecting it to one side of said frame; means operative to latch the other end of said casing to the other side of said frame, said means being releasable to allow the casing to be swung to inverted position with relation to said frame; an electric light bulb within said casing, having a base mounted in said back and having a pair of terminal contacts, said casing being of substantial depth between said indicator face and back to accommodate the height of said light bulb therebetween; a terminal carried by said frame; and yielding conductor means normally conducting connection between said terminal and one of said terminal contacts for establishing a normal operating circuit; a breaker contact carried by said casing and electrically connected to the other of said terminal contacts; a coacting breaker contact carried by said frame and normally in engagement with said first mentioned breaker contact; a movable test contact carried by said casing near its said other end; and a second test contact carried by said frame in normally opposed, spaced relation to said movable test contact, for engagement thereby upon depression of said other end of the casing, for establishing a test circuit to said bulb, said breaker contact being arranged for separation upon engagement of said test contact, whereby to break said normal operating circuit.

18. An indicator device comprising: a mounting frame of U-section including a pair of side arms and a back member extending between and joining said side arms; an elongated lamp casing having a narrow elongated light-transmitting front and a lamp-mounting back, normally received within said frame; a hinge joining one end of said casing, near said front, to one of said side arms; latch means operating between the other of said side arms and said other end of the casing to normally retain said casing in an operative position; a lamp socket in said casing back; an electric lamp having a central contact and a base constituting a lateral contact mounted in said socket; a yielding contact mounted on said back member and yieldingly engaging said central contact between said back member and casing back; a breaker contact carried by said latch means; a movable contact carried by said casing at said other end thereof, connected to said lamp base and normally engaged with said breaker contact; and a test contact carried by said back member rearwardly of said other end of the casing in a position opposed to said movable contact, said casing being arranged so that its said other end can be depressed away from said latch toward said frame, whereby to first break contact between said movable contact and said breaker contact and then establish contact between said movable contact and said test contact; and said latch means being operable to release said other end of the casing so that the casing can be inverted to expose the rear end of said lamp for removal through said casing back from the rear side thereof, and to expose the interior of said frame for servicing operations.

19. An indicator as defined in claim 18, wherein said movable contact is embodied in a bus bar comprising a body portion secured to the rear face of said casing back and a bent end portion extending along said other end of the casing for engagement with said breaker contact, said test contact being engageable with the end of said body portion adjacent said bent end portion.

No references cited.